US008720375B2

(12) United States Patent
Miller et al.

(10) Patent No.: US 8,720,375 B2
(45) Date of Patent: May 13, 2014

(54) CLAY-BASED SUPERIOR ANIMAL LITTER

(75) Inventors: Richard D. Miller, Union Beach, NJ (US); Mark Ventura, Freehold, NJ (US); Raymond S. Brown, Bridgewater, NJ (US)

(73) Assignee: Church & Dwight Co., Inc., Princeton, NJ (US)

( * ) Notice: Subject to any disclaimer, the term of this patent is extended or adjusted under 35 U.S.C. 154(b) by 77 days.

(21) Appl. No.: 13/473,660

(22) Filed: May 17, 2012

(65) Prior Publication Data

US 2013/0305997 A1    Nov. 21, 2013

(51) Int. Cl.
A01K 29/00    (2006.01)

(52) U.S. Cl.
USPC .......................................... 119/173

(58) Field of Classification Search
USPC ................................. 119/173, 171
See application file for complete search history.

(56) References Cited

U.S. PATENT DOCUMENTS

| | | | |
|---|---|---|---|
| 4,355,593 A | | 10/1982 | Stapley |
| 4,465,019 A | * | 8/1984 | Johnson ........................ 119/171 |
| 4,685,420 A | | 8/1987 | Stuart |
| 4,704,989 A | | 11/1987 | Rosenfeld |
| 4,883,021 A | | 11/1989 | Ducharme et al. |
| 5,014,650 A | | 5/1991 | Sowle et al. |
| 5,101,771 A | * | 4/1992 | Goss ............................. 119/173 |
| 5,339,769 A | * | 8/1994 | Toth et al. ..................... 119/173 |
| 5,801,116 A | | 9/1998 | Cottrell et al. |
| 5,970,916 A | | 10/1999 | Yoder et al. |
| 5,992,351 A | | 11/1999 | Jenkins |
| 6,053,125 A | | 4/2000 | Kory et al. |
| 6,253,710 B1 | | 7/2001 | Ward et al. |
| 6,287,550 B1 | | 9/2001 | Trinh et al. |
| 6,371,049 B1 | | 4/2002 | Boden et al. |
| 6,622,658 B2 | | 9/2003 | McPherson et al. |
| 6,662,749 B1 | | 12/2003 | Wiedenhaft et al. |
| 6,745,720 B2 | * | 6/2004 | Rasner et al. .................. 119/172 |
| 7,247,377 B2 | | 7/2007 | Jassan et al. |
| 7,429,421 B2 | * | 9/2008 | Greene et al. .................. 428/403 |
| 7,603,964 B2 | | 10/2009 | Jenkins et al. |
| 8,074,604 B2 | | 12/2011 | Swank |
| 2003/0218022 A1 | | 11/2003 | Chomik et al. |
| 2005/0005869 A1 | | 1/2005 | Fritter et al. |
| 2005/0005870 A1 | | 1/2005 | Fritter et al. |
| 2005/0145186 A1 | | 7/2005 | Fung et al. |
| 2005/0175577 A1 | * | 8/2005 | Jenkins et al. ................ 424/76.1 |
| 2006/0243212 A1 | * | 11/2006 | Jenkins et al. ................. 119/171 |
| 2008/0140037 A1 | | 6/2008 | Newman |
| 2009/0000562 A1 | | 1/2009 | Jenkins et al. |
| 2009/0308323 A1 | * | 12/2009 | Van Nieuwenhuijzen-Van Rooijen et al. ................ 119/173 |
| 2010/0269759 A1 | | 10/2010 | Privitera et al. |
| 2012/0012064 A1 | | 1/2012 | Jenkins et al. |
| 2013/0199456 A1 | | 8/2013 | Bracilovic et al. |

FOREIGN PATENT DOCUMENTS

WO    03089230    10/2003

* cited by examiner

*Primary Examiner* — Yvonne Abbott
(74) *Attorney, Agent, or Firm* — Fishman & Associates, LLC.

(57) ABSTRACT

The invention is directed toward a high performance clay-based animal litter that is comprised of a clay-based liquid-absorbing material, and at least one filler coated with at least one clumping agent. The particle size of the liquid-absorbing material is small and provides the litter with a "sandy" appearance. The high performance litter is found to be surprisingly effective in containing odors and reducing tracking and dusting. It does not contain foaming agents and/or acids to trigger foaming, and does not utilize foams to block odors.

21 Claims, No Drawings

CLAY-BASED SUPERIOR ANIMAL LITTER

FIELD OF THE INVENTION

The present invention relates to an absorbent composition and its method of production, as well as its use as an animal litter. Particularly, the present invention relates to an absorbent composition that coats animal waste and provides an effective odor control.

BACKGROUND OF THE INVENTION

Before the advent of litters, pet owners had relegated pets to outside the home for lack of an area for taking care of pet excrement. Litters allow pets to take care of waste functions and live inside the home. Housebroken animals, such as cats, are trained into the habit of urinating and defecating in a specially provided litter box. Similarly, untrained and caged animals, such as guinea pigs, urinate and defecate on the floor of their cage, often in approximately the same floor area of the cage. Consequently, pet owners, homeowners, veterinarians and laboratory personnel have added liquid-absorbing materials to the litter box or cage to collect the urine and feces.

The most commonly used litter box liquid-absorbing materials are inexpensive clays, such as calcined clays, that are safe and non-irritating to the animals, and that absorb substantial amounts of liquids. Other porous, solid litter box absorbent materials, that are used alone or in combination, include straw, sawdust, wood chips, wood shavings, porous polymeric beads, shredded paper, sand, bark, cloth, ground corn husks, and cellulose. Each of these absorbent materials has the advantage of low cost. The entire contents of the litter box including the soiled and unsoiled liquid-absorbing materials will eventually be removed because of the offensive odor caused by the absorbed urine and feces.

Most litters do not adequately control the odor associated with urine. The simple absorption of liquid, which litters typically provide, does little to counteract the growth of odor-causing bacteria. Currently clay soils or comminuted rocks, e.g. the sodium bentonites, are used in an attempt to improve litter compositions. Sodium bentonites absorb liquid waste such as urine, and may also absorb some of the odor associated with the liquid waste, as the material binds amine compounds in the "face sites" of the clay interlayers. Plant-based litters, such as those made from wood chips or corn, can also absorb liquid waste, and be made disposable with the aid of clumping agents, but, again, litter box odor remains. This is because a significant contributor to "litter box smell" is the odor resulting from bacterial action on "aged" urine after three or so days in a litter box. In some cases, some of the urine can even collect and pool at the bottom of the litter box making an excellent breeding ground for bacteria. It is this bacteria from "old urine" in the litter box that most litters do not cover up well, and which is particularly troublesome to consumers.

Moreover, traditional plant-based or clay-based litters that are composed of sodium bentonites or other materials do not address the issue of fecal odor. Fecal odor differs from urine odor in that the odor is produced immediately at the time of defecation. Materials in fecal odor that carry an especially strong impact include butyric acid, p-cresol, skatole, and dimethyltrisulfide.

Furthermore, these traditional litter compositions are often formed from coarse granules, such that the granule's irregularity in both shape and size creates tracking by animals after usage, and dust formation that is associated with granule bumping.

There is also a concern of the rising cost of litter ingredients due to limited resources or unexpected high demands. For example, guar gum, a clumping agent, is also used in hydraulic fracturing ("fracking") to adjust fracturing fluid viscosity. The recent popularity of fracking has driven up the cost of guar gum dramatically, forcing other industries to search for an alternative.

Various attempts to address the above issues are known in the art. For example, U.S. Pat. No. 8,074,604 to Swank teaches an animal litter that includes a sorbent material that is composed of granule particulate, which is able to pass a −20 screen sieve. The sorbent material is combined with a binder such that greater than 90% of the granules have a size of between −5 and +60 screen sieve. The Swank granules also have an oil coating. The feedstocks operative in the Swank invention include corncob, bentonite, diatomaceous earth, attapulgite, montmorillonite, cellulosic plant stalks, husks and hulls, and combinations thereof.

US Patent Application Numbers 2009/000562 and 2012/0012064 to Jenkins et al. teach a waste encapsulating animal litter that encapsulates the solid and liquid animal waste within a shell that has a thickness of at least 1 mm, and wherein the litter comprises a water reactive polymer as a binder, an acidic solid material, and a carbonate-containing or percarbonate-containing solid material.

U.S. Pat. No. 5,101,771 to Goss teaches an animal litter made from clay materials and a combination of hydroxypropylmethylcellulose, a clumping agent, and mineral oil, which acts as a dedusting agent.

The above references teach improvements of the traditional litters and disclose modifying base particle sizes and the use of additives such as binders and acids. However, these references only address one of many concerns and do not present a full solution to the challenges presented in finding a litter which will satisfy consumer needs. Further improvements must be implemented to effectively reduce tracking and odors, while yielding a litter which may be economically manufactured.

SUMMARY OF THE INVENTION

The invention is directed toward a superior performance clay-based animal litter which comprises a clay-based liquid-absorbing material, and at least one filler that is coated with at least one clumping agent. The particle size of the liquid-absorbing materials is small enough to provide the litter with a "sandy" appearance. This superior litter is found surprisingly effective in coating animal waste, thereby dramatically reducing odors. This is accomplished by maximizing the litter's contact with the waste to intercept and block odor emanating from the surface. In addition, the small particle size reduces tracking and dusting. Moreover, it does not contain foaming agents and/or acids, nor does it require foams to encapsulate the waste in order to block odors.

DETAILED DESCRIPTION OF THE INVENTION

The invention is directed toward a superior performance clay-based animal litter comprising a clay-based liquid-absorbing material, and at least one filler that is coated with at least one clumping agent. The particle size of the liquid-absorbing material for the litter is small enough to provide the litter with a "sandy" appearance. This litter is found surprisingly effective in coating animal waste, thereby blocking odors emanating therefrom, while reducing tracking and dusting. Moreover, the improved animal litter of Applicant's claimed invention does not contain foaming agents and/or acids and does not utilize foams to block odors.

Liquid-Absorbing Material

Clays are commonly used liquid-absorbing materials for animal litters. The water-absorbent clay may be, for example, a clay soil or comminuted rock containing at least one water swellable clay mineral. Such a clay mineral may be, for example, a montmorillonoid or smectite, having a three-layer, sheet structure crystal lattice with two layers of silicon/oxygen tetrahedrons between a central layer of aluminum and/or magnesium/oxygen dioctahedrons or trioctahedrons. Part of the silicon in the tetrahedral layers may be substituted with aluminum and part of the aluminum and/or magnesium in the central octahedral layer may be substituted with other elements such as lithium, chromium, zinc, or iron. Contemplated above described montmorillonoid clay minerals for the instant invention are montmorillonite and nontronite containing a dioctahedral central layer, and hectorite, saponite, and sauconite containing a trioctohedral central layer.

When the above-described montmorillonoid clay minerals are contacted with water or water vapor, the water molecules penetrate between the layers causing interlayer or intracrystalline swelling and expansion of the entire lattice. This causes the particles of the clay component in the animal litter to agglomerate, thus facilitating the removal of that portion of the litter which is swelled by urine and/or other aqueous waste liquid.

The preferred clay component of the animal litter of the present invention is a comminuted bentonite, more preferably a sodium bentonite, which contains a preponderant amount of montmorillonite clay mineral. The use of bentonite clays in a variety of applications, such as a component in drilling muds, is well known. Bentonites are economical, readily available clays, with certain forms capable of hydrating and swelling in the presence of water. The swelling properties of bentonite are related to the exchangeable cations present in the particular bentonite ore. The water-swellable bentonite clays contain various exchangeable cations, including sodium, potassium, lithium, ammonium, calcium and magnesium. While any of these cations can be the predominant exchangeable cation of the bentonite clay of the present invention, often bentonite clays will include a variety of exchangeable cations.

The water-swellable bentonite clays useful in the present invention include any water-swellable bentonite clays that hydrate in the presence of water, i.e., swell in the presence of water. The water-swellable bentonite clay is selected from the group consisting of sodium bentonite, potassium bentonite, lithium bentonite, calcium bentonite and magnesium bentonite, or combinations thereof. The bentonite clay may be any member of the dioctahedral or trioctahedral smectite group, or a mixture thereof; examples include Montmorillonite, Beidellite, Nontronite, Hectorite and Saponite, and combinations thereof.

Clays dominate the animal litter market. However, the naturally clumping clays are not the only water-absorbing materials useful in litter. Other water-absorbing materials which may be used include non-clumping clays, which may or may not be converted to clumping clays with the addition of clumping agents.

Useful non-clumping clays include attapulgite, Fuller's earth, calcium bentonite, palygorskite and sepiolite. The Fuller's earth clay referred to herein is a natural and earthy material composed primarily of hydrous aluminum silicates, and which may contain small amounts of non-clay materials. The calcium bentonite clays can range in color from a cream or off-white to a dark reddish tan color and are frequently referred to in the trade under designations such as Mississippi Brown and Mississippi White. The various animal litter clays can be divided into heavy weight clays and lightweight clays. Fuller's earth and calcium bentonite are heavy weight clays, while sepiolite and attapulgite (palygorskite) are lightweight clays.

Still other non-clumping clays useful as the liquid-absorbing material in the litter of this invention may include kaolinite, illite, halloysite, hormite, vermiculite or mixtures thereof.

While a large part of the animal litter market is dominated by clumping and non-clumping clays, the remainder of the market consists of a variety of nonclay substances. Examples of non-clay materials that can be used in the present invention, and may or may not be treated with clumping agents, include zeolites, crushed stone (like dolomite), and light density aggregates and silica gels. It should be noted that clumping clays, such as sodium bentonite, may be mixed with any of the above materials to form the water-absorbing material.

It has been surprisingly found that the particle size of the liquid-absorbing material can be reduced to a level such that the material can be packed and distributed uniformly within a shipping container, while simultaneously forming a litter with reduced tracking and dusting properties. In particular, a preferred particle size is equal to or greater than 0.5 mm to equal to or less than 2.0 mm, and more preferably equal to or greater than 0.4 mm to equal to or less than 1.6 mm. At these small particle size ranges, the liquid-absorbing material is "sandy" and will be uniformly distributed throughout a shipping container along with other included components, including fillers, clumping agents and other additives.

Clumping Agent

Clumping agents, or clump enhancing materials, may be used with the present invention. Useful clumping agents are clumping clays, polysaccharides, water-soluble gums, dry particulate cellulosic ethers and water absorbent polymers, or mixtures thereof. Clumping agents promote adhesion of the fine size particles of litter granules to each other as well as adhesion of the particles to form agglomerates when wetted. Preferably, the clumping agent allows the formation of a gelled agglomerate when exposed to a liquid, such as animal urine.

Naturally occurring polymers which may be used as clumping agents in connection with the present invention include various starches, including corn starch, various gums such as gum arabic, gum karaya, gum tragacanth, gum ghatti, guar gum, and xanthan gum, as well as alginates, carrageenan, pectins, dextran, gelatin, gluten, and dried plants of the Plantago family. An example of a suitable gum-clumping agent is a water-soluble galactomannan gum, such as a guar gum or a locust bean gum, or an ether derivative thereof, that forms a gel upon contact with liquid. Suitable clumping agents further include vinyl polymers, including polyvinyl alcohol, polyvinyl esters such as polyvinyl acetate, polyvinylpyrrolidone, polyvinyloxazolidone, polyvinylmethyloxazolidone, copolymers and mixtures thereof.

Semisynthetic polymers are also useful as clumping agents in the present invention and include cellulose ethers and guar gum derivatives. The cellulose ethers may be methylcellulose, hydroxyethyl cellulose, hydroxypropyl cellulose, ethylhydroxyethyl cellulose, methylhydroxypropyl cellulose, carboxymethylcellulose, hydroxypropylmethylcellulose or mixtures thereof. Of these, hydroxypropylmethylcellulose is preferred. A combination of various vinyl, natural and semisynthetic polymers may also be used as clumping agents in the present invention.

Particularly useful polymers (such as super absorbent polymers) are capable of absorbing many times their own weight of an aqueous fluid such as urine. The agglomerates formed with such polymers have sufficient mechanical integrity to be conveyed from a litter box as a discrete entity using methods typically used in removing waste product from a litter box, such as with implements or manually.

Cellulose ether when used in accordance with the present invention forms a gel upon contact with the excreted bodily fluid. However, this organic resin is not so water-sensitive as to be triggered into clumping by contact with atmospheric water vapor. Mineral oil may be added in a relatively small amount to minimize premature clumping within the litter under humid conditions, and it distributes the clumping agent without substantial dusting.

Alternatively, materials that act as "sealants" can also be used as clumping agents. By "sealant" it is meant that these materials contribute in large measure to a coating of the animal waste product in such a manner that odor no longer emanates therefrom. The following groups of materials will clump and "seal" or coat waste either alone or in combination with other materials:
1. Synthetic water reactive polymers such as modified starches and modified cellulose (CMC),
2. Proteins such as gelatin and albumin,
3. Water soluble film-formers and gel-formers such as a polyethylene oxide, polyvinyl pyrrolidone (PVP), polyvinyl alcohol (PVA), polyethylene glycol (PEG), and polyacrylic acid, acrylates or similar, Modified polymeric materials such as PEG diacrylate, and PEG diol,
4. Barrier oils (silicone oil and mineral oil), encapsulated in a soluble matrix (such as starch),
5. Fluorocarbon polymers, macromers, or other synthetic polymeric macromers,
6. Fumed Silica, silicone-treated and not treated, to form physical water immiscible barrier,
7. Room temperature vulcanizing silicone, protected by encapsulation until activated,
8. Mineral cementing agents (bassanite—plaster of paris, portlandite),
9. High aspect ratio minerals to provide physical blocking such as mica or pyrophyllite,
10. High Aspect ratio odor blocking plastic film pieces (as disclosed in, e.g., US20030218022 A1 and WO2003089230 A1, which are hereby incorporated by reference in their entirety)
11. Water soluble papers and films such as rice paper or starch flakes,
12. Super absorbing polymers and acrylimides, especially as a fine powder,
13. Mixtures of the above materials, and
14. Any of the above combined with a crosslinking agent, especially a separate crosslinking agent that reacts when triggered by water.

Fillers

In addition, the present invention contemplates that filler materials such as limestone, sand, calcite, dolomite, recycled waste materials, zeolites, and gypsum may also be incorporated within recommended clay materials to reduce the cost of the litter, without significantly decreasing the litter's performance. In fact, the filler may be considered to be, in effect, a non-absorbent carrier or substrate for the liquid-absorbing clay. For the present invention, the clay-based litter contains at least one filler material that is coated with at least one clumping agent prior to its mixture with the clay particulates. The coating is achieved by spray-drying, crude mixing or other processes known in the art. This ratio of the filler material to the clay-based liquid-absorbing material should be maintained within certain ranges in order to achieve superior results. In particular, while a carrier or substrate such as limestone, dolomite or calcite may comprise from 15% to 60% of the total weight of the litter, and more preferably from 40% to 60% of the total weight of the litter, the weight ratio of the clay-based absorbent materials to the filler material should be in the range of preferably from 6:1 to 1:2, and more preferably from 1.5:1.0 to 1.0:1.5.

Binders

Useful binders operative in connection with the present invention are carbohydrates such as monosaccharides, disaccharides, oligosaccharides and polysaccharides; proteins; lipids; glycolipid; glycoprotein; lipoprotein; and combinations and derivatives of these. Specific carbohydrate binders illustratively include glucose, mannose, fructose, galactose, sucrose, lactose, maltose, xylose, arabinose, trehalose and mixtures thereof, such as corn syrup; celluloses, such as carboxymethylcellulose, ethylcellulose, hydroxyethylcellulose, hydroxy-methylethylcellulose, hydroxyethylpropylcellulose, methylhydroxyethyl-cellulose, methylcellulose; starches, such as amylose, seagel, starch acetates, starch hydroxyethyl ethers, ionic starches, long-chain alkyl starches, dextrins, amine starches, phosphate starches, and dialdehyde starches; plant starches, such as corn starch and potato starch; other carbohydrates, such as pectin, amylopectin, xylan, glycogen, agar, alginic acid, phycocolloids, chitin, gum arabic, guar gum, gum karaya, gum tragacanth and locust bean gum; complex organic substances, such as lignin and nitrolignin; derivatives of lignin, such as lignosulfonate salts, illustratively including calcium lignosulfonate and sodium lignosulfonate; and complex carbohydrate-based compositions containing organic and inorganic ingredients, such as molasses. Suitable protein binders illustratively include soy extract, zein, protamine, collagen, and casein. Binders operative herein also include synthetic organic polymers capable of promoting or producing cohesion of methylene urea oligomer fines, and these illustratively include ethylene oxide polymers, polyacrylamides, polyacrylates, polyvinyl pyrrolidone, polyethylene glycol, polyvinyl alcohol, polyvinylmethyl ether, polyvinyl acrylates, polylactic acid, and latex. In a preferred embodiment, the binder is calcium lignosulfonate, molasses, a liquid cornstarch, a liquid corn syrup, carboxymethylcellulose, guar gum or combinations thereof. A binder may also preferably be selected from starch materials such as X-PAND'R® Starch by Tate & Lyle, or dextrins such as Dextrin 235 by Tate & Lyle.

Optional Components

The superior-performing clay-based litter composition of the present invention optionally includes a biocide, a de-dusting agent and/or fragrance. The biocide is for protecting the litter from fungal and algal growth. For example, a suitable biocide is Acticide® MBS by Thor Specialties, Inc., Shelton, Conn. Most significantly, the biocide inhibits the bacterial action on urine, which can cause some of the most troublesome litter box odor.

The de-dusting agent may be selected from water-soluble polymeric resins, such as polyvinyl alcohol, polyvinyl acetate, polyvinyl pyrrolidone, polyacrylic acid, guar gum, xanthan gum, gum arabic, other natural resins and mixtures of any of these resins. An inorganic de-dusting agent, such as calcium chloride, may also be used.

If a fragrance is utilized, an amount of fragrance in an acceptable range, typically from 0.01-10.0%, may be employed. The fragrance may be added to the absorbent composition during the process of making the composition or after the absorbent composition is made.

Formulation

The clay-based animal litter of the present invention is comprised of at least one clay-based liquid-absorbing material, and at least one filler that is coated with at least one clumping agent. The litter further includes a binder.

The liquid-absorbing material that is used in the clay-based formulation is in the amount of 40 to 99 Wt. %, while an amount of 50 to 95 Wt. % of the total litter composition is also useful. The particle size of the liquid-absorbing material should range from equal to or greater than 0.5 mm to equal to or less than 2.0 mm (about U.S. mesh size 35 to U.S. mesh size 10), preferably equal to or greater than 0.4 mm to equal to or less than 1.6 mm (about U.S. mesh size 40 to U.S. mesh size 14), and more preferably equal to or greater than 0.4 mm to equal to or less than 1.2 mm (U.S. mesh size 40 to U.S. mesh size 16). Such particle sizes may be achieved by clarifying procedures known in the art, such as grinding followed by sieving. The particle size of the liquid-absorbing material is comparable to the size of sand, which has a benefit of greatly reducing tracking or the spreading of litter from the box by the animal.

The filler that is used in the clay-based formulation is in the amount of 10 to 60 Wt. %, preferably 30 to 60 Wt. %, and more preferably 45 to 60 Wt. % of the total litter composition. The particle size of the filler may range from equal to or greater than 0.3 mm to equal to or less than 2.0 mm (about U.S. mesh size 50 to U.S. mesh size 10), and more preferably equal to or greater than 0.25 mm to equal to or less than 0.85 mm (about U.S. mesh size 60 to U.S. mesh size 20). The particle size of the filler is generally smaller than the particle size of the liquid-absorbing material. A preferred filler is dolomite, limestone, calcite or mixtures thereof. The filler is coated with at least one clumping agent by means of crude mixing, spray-drying, or other processes known in the art.

The clumping agent is present in the amount of 0.1 to 20.0 Wt. %, preferably 0.25 to 10.0 Wt. %, and more preferably 0.45 to 7.0 Wt. % of the total litter composition.

A de-dusting agent such as mineral oil, if used, is present in the amount of 0.1 to 10.0 Wt. %, and preferably in the amount of 0.5 to 5.0 Wt. % of the total litter composition.

A binder, if used, is present in the amount of 0.1 to 20.0 Wt. %, preferably 0.25 to 10.0 Wt. %, and more preferably 0.45 to 5.0 Wt. % of the total litter composition.

The clumping agent is optionally coated or sprayed with a de-dusting agent (i.e. mineral oil) after the initial filler coating operation is complete. The filler is then coated with the treated clumping agent. The coated filler is then mixed with the sieved clay-based liquid-absorbing material and other additives such as binder and/or fragrance to form the clay-based inventive animal litter. It should be noted that the clay-based inventive litter does not contain foaming agents and/or acids. Furthermore, the inventive litter does not require foams to encapsulate the waste in order to block odors.

The small particle size of the liquid-absorbing material within the clay-based inventive litter contributes to a high surface area. The high surface area means the particles are able to coat and stick to feces, which results in over 90% coverage and effectively prevents odors from emanating. The litter forms "rock hard" urine clumps such that pieces do not break off and fall back into the litter box. Thus, in addition to blocking odors, the "rock hard" clumps permit full clump removal by the consumer.

Other advantages of the clay-based inventive litter include the fact that, unlike conventional litters which may adhere to the sides of a litter box and require scraping to dislodge, when a litter box filled with the litter of the instant invention is emptied, the litter and waste tend to pour smoothly out of the litter box with minimal adhesion to the sides of the box, with no scraping required to facilitate removal.

Moreover, the clumps formed in the litter of the instant invention have a demonstrated ability to retain their integrity during removal from a litter box. A common problem with the clumps formed in sodium bentonite litters is that the clumps formed therein tend to fragment during a typical removal process, which generally will involve scooping or a similar process. However, the clumps formed in the litter of the instant invention retain their integrity, thereby permitting easy removal of the entire soiled portion of the litter.

Method of Use

The litter compositions of this invention may be used for a wide variety of animals and birds, e.g., uncaged household pets, such as cats and dogs, particularly puppies too young to be walked; caged pets, such as hamsters, gerbils and rabbits; caged laboratory animals, such as guinea pigs, mice, rats and monkeys; animals raised for fur, such as mink; barnyard birds, such as chickens, ducks and geese; and pet birds, such as parrots, parakeets, canaries and pigeons. The compositions of this invention are particularly suitable for use as cat litters.

EXAMPLE 1

This example demonstrates the superior coating ability of or animal waste coverage achieved with the inventive clay-based litter as compared to commercially available clumping litters. Conventional and inventive litters were used to cover pieces of a modeling compound, which imitated animal feces. In particular, a dough was made from a mixture of flour, water, and vegetable oil. The ready-made dough was cut into pieces, with each piece weighted about 15.5 g. The dough pieces were wetted with water then buried within about 1 kg of litter sample for 24 hours. The dough pieces were then dug out later and examined for coverage. A total of 8 individuals participated in this test, and each individual visually observed 6 different litter samples:

| Litter | Percentage Covered | | | | | | | | |
|---|---|---|---|---|---|---|---|---|---|
| | 1 | 2 | 3 | 4 | 5 | 6 | 7 | 8 | Average |
| FELINE PINE ®* | 60% | 70% | 55% | 70% | 45% | 40% | 40% | 65% | 56% |
| ARM & HAMMER ® DOUBLE DUTY† | 70% | 70% | 68% | 75% | 60% | 60% | 80% | 70% | 69% |
| Inventive Litter-Clay Base | 100% | 100% | 99% | 100% | 85% | 95% | 100% | 100% | 97% |
| Inventive Litter-Corn Base | 100% | 100% | 100% | 100% | 90% | 98% | 100% | 100% | 99% |
| TIDY CATS ®‡ | 70% | 70% | 60% | 85% | 50% | 65% | 85% | 70% | 69% |

-continued

| Litter | Percentage Covered | | | | | | | | Average |
|---|---|---|---|---|---|---|---|---|---|
| | 1 | 2 | 3 | 4 | 5 | 6 | 7 | 8 | |
| FRESH STEP ®§ | 80% | 80% | 75% | 90% | 60% | 75% | 80% | 80% | 78% |

*FELINE PINE is a registered trademark of Church & Dwight Co., Inc. This product is marketed as a clumping litter and is widely available in retail stores.
†ARM & HAMMER is a registered trademark of Church & Dwight Co., Inc. This product is marketed as a clumping litter and is widely available in retail stores.
‡TIDY CATS is a registered trademark of Société des Produits Nestlé S.A., This product is marketed as a clumping litter and is widely available in retail stores.
§FRESH STEP is a registered trademark of Clorox Pet Products Company. This product is marketed as a clumping litter and is widely available in retail stores.

As is shown by the above data, the inventive litter composition consistently out-performed the conventional commercially available litters by providing at least 90% coverage of the dough feces.

EXAMPLE 2

This example demonstrates the superior dusting resistance of a clay-based litter of the present invention as compared to commercially available clay-based litters. Opacities of the inventive litter and various conventional commercial litters were measured. In particular, a 500 cc litter sample was poured into an acrylic cylinder that was fitted with a photo optic opacity meter, which was situated at a point across and above the base of the cylinder. After a litter sample was added, an opacity reading was taken. The reading was recorded as % opacity. A total of 8 different litter samples were tested. Such a measurement of opacity is a measurement of the dusting property of the litter, with a lower reading indicating less airborne dust:

| | Opacity |
|---|---|
| ARM & HAMMER ® DOUBLE DUTY** | 3.4 |
| TIDY CATS ® Instant Action†† | 2.23 |
| SCOOP AWAY ® Ammonia‡‡ | 15.1 |
| SCOOP AWAY ® Multicat Formula | 12.26 |
| FRESH STEP ® Extreme Odor§§ | 7.53 |
| FRESH STEP ® Odor Shield | 5.46 |
| FRESH STEP ® Multicat | 9.76 |
| Inventive Clay-based Litter | 0.0 |

**ARM & HAMMER is a registered trademark of Church & Dwight Co., Inc. This product is marketed as a clumping litter and is widely available in retail stores.
††TIDY CATS is a registered trademark of Société des Produits Nestlé S.A., This product is marketed as a clumping litter and is widely available in retail stores.
‡‡SCOOP AWAY is a registered trademark of Clorox Pet Products Company. This product and the one below are marketed as clumping litters and are widely available in retail stores.
§§FRESH STEP is a registered trademark of Clorox Pet Products Company. This product and the one below are marketed as clumping litters and are widely available in retail stores.

As is shown above, the inventive litter has no dusting, or 0% of obscurity of the optic meter, which is in sharp contrast to the various conventional commercial litter samples.

EXAMPLE 3

The following is the formulation for the clay-based inventive litter, the properties of which were compared to the properties of other commercially available litters in Examples 1 and 2:

| Clay Based Improved Litter Compositions | | |
|---|---|---|
| Ingredient | Supplier | Formulation % |
| Sodium Bentonite (−16, +40 Mesh) | Any conventional source | 45-50 |
| Limestone (−20, +60 Mesh) | Any conventional source | 45-50 |
| ACTICIDE ® MBS*** | Thor | <1 |
| SIPERNAT ® 22††† | EVONIK DEGUSSA ®‡‡‡ | <0.5 |
| Water | In-house | <1 |
| X-PAND'R ®§§§ Starch | TATE & LYLE ®**** | <1 |
| Guar Gum | V L Clark | <1 |
| Mineral Oil | Perol Ind. | 1 |
| Fragrance | FIRMENICH ®†††† | <0.5 |
| TOTAL | | 100 |

***ACTICIDE is a registered trademark of THOR GMBH Corporation.
†††SIPERNAT is a registered trademark of EVONIK DEGUSSA GMBH.
‡‡‡EVONIK DEGUSSA is a registered trademark of Evonik Industries AG CORPORATION.
§§§X-PAND'R is a registered trademark of A. E. Staley Manufacturing Company.
****TATE & LYLE is registered trademark of Tate & Lyle Plc.
††††FIRMENCH is a registered trademark of FIRMENICH S.A.

The invention claimed is:

1. A high performance animal litter comprising a clay-based liquid-absorbing material and at least one filler, consisting of a non-absorbent, non-soluble substrate that is coated with at least one clumping agent, wherein said clay-based liquid-absorbing material has a particle size that is equal to or greater than 0.4 mm to equal to or less than 1.2 mm, and present in the amount of 40 to 85 wt. % of said total litter composition.

2. A high performance animal litter according to claim 1, wherein the nonabsorbent, non-soluble substrate is selected from limestone, dolomite, calcite or mixtures thereof.

3. The animal litter of claim 1, wherein said at least one filler has a particle size that is equal to or greater than 0.25 mm, to equal to or less than 0.85 mm.

4. The animal litter of claim 1, wherein said clay-based liquid-absorbing material is selected from clumping and non-clumping clay materials or mixtures thereof.

5. The animal litter of claim 4, wherein said clay-based liquid-absorbing material is selected from sodium bentonite, kaolinite and attapulgite.

6. The animal litter of claim 1, wherein said at least one clumping agent is selected from clumping clays, polysaccharides, water-soluble gums, dry particulate cellulose ethers, water absorbent polymers and mixtures thereof.

7. The animal litter of claim 6, wherein said clumping agent is selected from gum-clumping agents, methylcellulose, carboxymethylcellulose, hydroxypropylmethylcellulose and mixtures thereof.

8. The animal litter of claim 1, wherein said litter further includes an agent that is selected from the group consisting of a binder, a de-dusting agent, a biocide, and mixtures thereof.

9. The animal litter of claim 8, wherein said agent is a binder that is selected from the group consisting of carbohydrates, starches, proteins, lipids, synthetic organic polymers, water-soluble gums, and mixtures thereof.

10. The animal litter of claim 9, wherein said binder is selected from starch, carboxymethylcellulose, and guar gum or mixtures thereof.

11. The animal litter of claim 8, wherein said agent is a de-dusting agent that is mineral oil.

12. The animal litter of claim 8, wherein said agent is a biocide that is an isothiazolin compound.

13. A method for producing a clay-based, high performance animal litter, comprising: 1) clarifying a clay-based liquid-absorbing material to a particle size of equal to or greater than 0.4 mm to equal to or less than 1.2 mm, 2) sieving at least one filler to a particle size of equal to or greater than 0.25 mm to equal to or less than 0.85 mm, 3) coating said at least one filler with at least one clumping agent, and 4) mixing said coated filler with said sieved clay-based liquid-absorbing material to form said litter, wherein said clay-based liquid-absorbing materials is present in the amount of 40 to 85 wt. % of said total litter composition.

14. The method of claim 13, wherein said method further includes mixing said mixture from said step 4 with an agent that is selected from the group consisting of a binder, a de-dusting agent, a biocide, and mixtures thereof.

15. The method of claim 14, wherein said agent is a clumping agent that is selected from gum-clumping agents, methylcellulose, carboxymethylcellulose, hydroxypropylmethylcellulose and mixtures thereof.

16. The method of claim 14, wherein said agent is a de-dusting agent that is mineral oil.

17. The method of claim 14, wherein said agent is a binder that is selected from starch, carboxymethylcellulose and guar gum or mixtures thereof.

18. The method of claim 14, wherein said agent is a biocide that is an isothiazolin compound.

19. The method of claim 13, wherein said clay-based liquid-absorbing material is sodium bentonite.

20. The method of claim 13, wherein said filler is dolomite, limestone, calcite or mixtures thereof.

21. The method of claim 13, wherein said coating is achieved by crude mixing or spray drying.

* * * * *